United States Patent [19]

Campbell et al.

[11] 4,147,550

[45] Apr. 3, 1979

[54] PHOTOGRAPHIC SILVER HALIDE ELEMENT WITH A LAYER OF SULFONATED POLYMER

[75] Inventors: Gerald A. Campbell, Webster; Richard N. Kelley, Fairport, both of N.Y.

[73] Assignee: Eastman Kodak Company, Rochester, N.Y.

[21] Appl. No.: 816,127

[22] Filed: Jul. 15, 1977

[51] Int. Cl.$^2$ .............................................. G03C 1/78
[52] U.S. Cl. ................................... 96/87 A; 96/87 R
[58] Field of Search ............................... 96/87 A, 97 R

[56] References Cited

U.S. PATENT DOCUMENTS

| | | | |
|---|---|---|---|
| 3,232,899 | 2/1966 | Gaziak | 260/29.6 |
| 3,418,127 | 12/1968 | Milikan | 96/82 |
| 3,518,088 | 6/1970 | Dunn | 96/114 |
| 3,631,014 | 12/1971 | Wright | 260/93.5 |
| 3,631,070 | 8/1972 | Timmerman et al. | 96/1.5 |
| 3,791,831 | 2/1974 | Von Bonin et al. | 96/87 A |
| 3,792,029 | 2/1975 | Roubinek et al. | 260/88 Z |
| 3,856,530 | 12/1974 | Van Paesschen | 96/87 A |
| 3,857,729 | 12/1974 | Burwasser | 96/87 A |
| 3,870,663 | 3/1975 | Clemens et al. | 96/2.1 E |
| 4,010,117 | 3/1977 | Maruhashi et al. | 96/87 A |

*Primary Examiner*—Jack P. Brammer
*Attorney, Agent, or Firm*—Arthur H. Rosenstein

[57] ABSTRACT

Disclosed herein are microgel compositions useful for the preparation of electrically conductive or antistatic layers in radiation sensitive materials, and particularly in photographic materials. The compositions comprise an aqueous dispersion of a sulfonated crosslinked polymer, preferably mixed with a binder. The polymer particles average less than one micron in diameter. Also disclosed herein is a method of preparing these microgel compositions.

7 Claims, No Drawings

PHOTOGRAPHIC SILVER HALIDE ELEMENT WITH A LAYER OF SULFONATED POLYMER

BACKGROUND OF THE INVENTION

1. Field of the Invention

This invention relates to radiation sensitive materials, and particularly photographic materials, their preparation, their use and polymeric compositions useful therein. In particular, this invention relates to the preparation and use of sulfonated anionic microgel latices to form electrically conductive or antistatic layers in radiation sensitive materials. These latices are clear and colorless and have an average diameter particle size of less than 1 micron.

2. Description of the Prior Art

Sulfonated styrene-containing resins are quite well known as useful in many connections. Several references disclosing various utilities include U.S. Pat. Nos. 2,533,210, issued Dec. 12, 1950 and 2,718,514, issued Sept. 20, 1955 which relate to the sulfonation of polystyrenes with a complex of sulfur trioxide and bis-(beta-chlorethyl) ether for use as dispersing agents, thickening agents and the like; U.S. Pat. No. 2,616,917, issued Nov. 4, 1952 which relates to polymers containing alkyl styrene sulfonate moieties; U.S. Pat. No. 2,837,500, issued June 3, 1958 which discloses the use of such resins as soil conditioners and dyeable fibers; U.S. Pat No. 2,909,508, issued Oct. 20, 1959 which relates to polymers of acrylamides and sulfonated styrenes useful as flocculants; U.S. Pat. No. 3,072,618, issued Jan. 8, 1963 which relates to sulfonation with sulfur trioxide-phosphate complexes; and U.S. Pat. No. 3,917,574, issued Nov. 4, 1975 which discloses a water-soluble sulfonated polystyrene-containing polyelectrolyte.

It is also known that polyvinyl aromatic monomers such as divinyl benzene, can be copolymerized with other aromatic monomers, such as styrene, to give crosslinked resins which are used advantageously in various ways as disclosed, for example, in U.S. Pat. No. 3,043,817, issued July 10, 1962; U.S. Pat. No. 3,549,562, issued Dec. 22, 1970; British specification No. 1,339,988, published Dec. 5, 1973; and West German Pat. No. 2,258,298.

Polymeric dispersions have been sought for some time for a variety of uses which have specific polymer particle sizes. Generally, suspension polymerization techniques, whether batch or continuous, have yielded particle sizes greater than 50 microns, but sometimes as small as 2 microns, as noted in U.S. Pat. No. 2,694,700, issued Nov. 16, 1954; U.S. Pat. No. 2,712,536, issued July 5, 1955; U.S. Pat. No. 3,631,014, issued Dec. 28, 1971; and U.S. Pat. No. 3,649,610, issued Mar. 14, 1972. Emulsion polymerization typically yields polymers having smaller particle sizes. U.S. Pat. No. 3,232,899 discloses a latex of a styrene-containing polymer having 0.05 to 0.3 micron particle sizes, which when dried forms a continuous film. Similar emulsions are described in U.S. Pat. No. 3,513,120, issued May 19, 1970. Netherlands Pat. No. 68,08638 relates to styrene-containing xerographic toner particles having particle sizes less than 20 microns.

Sulfonated polystyrenes have been mixed with ammonium fluoride and gelatin and used in layers of photographic elements to improve viscosity and conductivity of the layers, as disclosed in U.S. Pat. No. 3,861,924, issued Jan. 21, 1975. No crosslinked sulfonated copolymers containing polyvinyl aromatic moieties are disclosed, however.

U.S. Pat. No. 3,574,682, issued Apr. 13, 1971 relates to electrostatographic recording materials comprising a conductive processing agent which comprises polyvinyl benzene sulfonic acid or a salt thereof.

U.S. Pat. No. 2,678,306, issued May 11, 1954 relates to sulfonated, crosslinked terpolymers of styrene, a polyvinyl aromatic and another monomer containing pendant carboxyl groups which terpolymers are useful as cation exchange resins. The sulfonation was carried out with chlorosulfuric acid. The particle size of the resins, like that for all ion exchange resins, is considerably greater than 1 micron, and typically greater than 5.0 microns.

Both cationic and anionic resins are known to be useful as conductive membranes, as disclosed in U.S. Pat. Nos. 2,731,411, issued Jan. 17, 1956 and 3,887,499, issued June 3, 1975. Sulfonated, crosslinked ion exchange resins are also quite well known in the art, as disclosed in U.S. Pat. Nos. 3,792,029, issued Feb. 12, 1974 and 3,870,663, issued March 11, 1975; and West German Pat. Nos. 1,919,382 and 2,015,206. Generally, sulfonated ion exchange resins, however, are made by suspension polymerization, resulting in average particle sizes significantly greater than 1 micron. Simply ball milling large particulate resins to produce smaller particles is impractical. To break particles down to less than 1 micron in size would require weeks of high energy milling with the attendant high energy costs and time expenditure. Further, since milling is often carried out in oily hydrocarbon solvents, the milled resins may be adversely affected or degraded in properties, such as undesired softening or reduction of storability. These adverse effects have been noted for other (non-sulfonated) resins and photographic materials, as disclosed in U.S. Pat. Nos. 3,418,127, issued Dec. 24, 1968 and 3,518,088, issued June 30, 1970. Moreover, milled resins must be isolated from the milling solvents and any impurities collected from the milling process before they can be used, thereby necessitating further manufacturing costs and time. It is not expected that ion exchange resins, if they could be ball milled to 1 micron particles would be useful as antistatic agents after subjection to the high energy milling process and organic milling solvents. Yet, larger particles would not give the clear and colorless films desired when coated with binders.

It is known that radiation sensitive materials and particularly photographic materials, have a tendency to accumulate static electrical charges during manufacture, handling and use. The static discharges cause irregular fog patterns in radiation sensitive layers or in photographic emulsions present therein. The static charges are also undesirable because dirt which the charges attract to the charged layers, causes repellancy spots, desensitization, fog and physical defects.

The generation of a static charge is a dynamic phenomenon which is affected by the rate of contact electrification of the charged layer by friction and the conductivity of the sheet (surface and internal) which controls the rate of dissipation of the charge. To avoid static charge the dissipation rate must be greater than the electrification rate. This value is determined herein by measuring surface conductivity in terms of surface resistivity at specific conditions of temperature and humidity, namely at 70° F. (24° C.) and 50% relative humidity, between two electrode plates and calculating the surface resistivity according to the formula:

$$\text{Resistivity (ohms)} = \text{Resistance observed (ohms)} \times \frac{\text{Spacing between electrodes (cm)}}{\text{length of electrodes (cm)}}$$

Further discussion of resistivity is found in U.S. Pat. Nos. 2,801,181, issued July 30, 1957 and 3,525,621, issued Aug. 25, 1970.

Antistatic layers are discussed in U.S. Pat. Nos. 3,376,277, issued Apr. 2, 1968 and 3,857,729, issued Dec. 31, 1974; Belgian Pat. No. 764,085; and British specification No. 1,217,184, published Dec. 31, 1970. Japanese Pat. No. 4722474 relates to water-soluble sulfonated styrene-containing copolymers which are useful in antistatic compositions. The polymers are sulfonated with sulfur trioxide adducted with dioxane. U.S. Pat. No. 3,681,070 relates to the sulfonation of uncrosslinked styrene-containing polymers with sulfur trioxide. The resulting polymers are used as antistatic coatings for sheet materials. U.S. Pat. No. 3,791,831, issued Feb. 12, 1974 relates to a mixture of polymers of, or a graft copolymer of, monomers having sulfo groups and monomers having carboxyl groups. The polymers are useful in antistatic layers although essentially water-soluble and uncrosslinked.

Hence, there is a need in the art for antistatic agents which can be used in radiation sensitive materials, and particularly photographic materials, without adverse sensitometric effects, which will not migrate throughout the various layers of such materials during processing, and which are clear and colorless. Further, there is a need for water-insoluble, but water-dispersible, crosslinked, sulfonated polymers which already have particle sizes below one micron assuring clear and colorless coatings. Such polymers are not readily produced by the mechanical breaking down of larger-sized polymer particles.

SUMMARY OF THE INVENTION

In accordance with this invention, it has been found that particular crosslinked sulfonated polymers are water-dispersible and useful as antistatic agents. These polymers have advantageously small latex particle sizes, notably less than one micron, thereby giving clear and colorless film coatings when mixed with binders. It has been also found that these polymers having small latex particles can be made by a method comprising a unique combination of steps.

In one aspect of the present invention, a composition comprises a water-dispersible, sulfonated polymer having latex particles less than about 1.0 micron in size and comprised of about 50 to about 99.9 mole percent of at least one polymerized and then sulfonated monovinyl aromatic monomer; about 0.1 to about 20 mole percent of at least one polymerized polyvinyl monomer; and 0 to about 50 mole percent of at least one other polymerized $\alpha,\beta$-ethylenically unsaturated monomer.

In another aspect of the present invention, a radiation sensitive element comprises a support having thereon a radiation sensitive layer and, on either side thereof, a layer comprising the sulfonated polymer described hereinabove.

Still another aspect of the present invention comprises a method for making a microgel dispersion comprising the sulfonated polymer described hereinabove, the method comprising: (1) emulsion polymerizing from about 50 to about 99.9 mole percent of at least one monovinyl aromatic polymerizable monomer, about 0.1 to about 20 mole percent of at least one polyvinyl polymerizable monomer, and 0 to about 50 mole percent of at least one other $\alpha,\beta$-ethylenically unsaturated polymerizable monomer; (2) isolating the resulting polymer latex and dispersing it in a chlorinated solvent to form a microgel; (3) sulfonating the resulting microgel latex; and (4) redispersing the resulting sulfonated microgel in water.

DETAILED DESCRIPTION OF THE INVENTION

As noted hereinabove, the sulfonated polymers described herein are formed from about 50 to about 99.9 mole percent of at least one sulfonated monovinyl aromatic polymerizable monomer. Typical of such monomers are sulfonated derivatives of vinyl benzene, vinyl naphthalene, vinyl anthracene; ring-substituted derivatives of these including o-, m- and p- alkyl styrenes having 1 to 20 carbon atoms in the alkyl, such as methyl, ethyl, propyl, butyl, isobutyl, octyl, lauryl styrenes, o, p-dialkyl styrenes and similar derivatives of vinyl naphthalene, and vinyl anthracene; o-, m- and p-halo-substituted derivatives, such as p-chlorostyrene, bromostyrene and the like and corresponding derivatives for vinyl naphthalene and the like; ketonic, carboxylate and carbonamide substituted derivatives; and vinyl aromatic compounds in which the alpha position of the vinyl group is substituted with an alkyl group having 1 to 10 carbon atoms or an aryl group having 6 to 12 carbon atoms, such as $\alpha$-methyl styrene, $\alpha$-ethyl styrene, $\alpha$-isopropyl styrene, $\alpha$-phenyl styrene, $\alpha$-methyl vinyl naphthalene and the like.

The polymers of the present invention also are formed from about 0.1 to about 20 mole percent of at least one polyvinyl polymerizable monomer that can provide crosslinking in the resulting polymer. Exemplary of such monomers are divinylbenzene, trivinylbenzene, divinylnaphthalene, di-iso-propenylbenzene, ethylene glycol dimethacrylate, ethylene glycol diacrylate, divinyl-phenyl vinyl ethers, the substituted alkyl or halo derivatives thereof, such as dimethyl divinylbenzene, chlorodivinylbenzene and the like, and other monomers polyfunctional with respect to vinyl grpoups.

From about 0 to about 50 mole percent of the described polymers is derived from one or more $\alpha,\beta$-ethylenically unsaturated polymerizable monomers other than those already mentioned. As exemplary of such monomers may be listed: vinyl esters such as methyl methacrylate, butyl acrylate, butyl methacrylate and ethyl acrylate; amides such as acrylamide, diacetone acrylamide, N-methyl acrylamide and methacrylamide; nitriles such as acrylonitrile and vinylbenzylnitrile; ketones such as methylvinylketone, ethylvinylketone, and p-vinyl acetophenone; halides such as vinyl chloride, vinylidene chloride and vinylbenzyl chloride; ethers such as methylvinyl ether; ethylvinyl ether and vinylbenzyl methyl ether; $\alpha,\beta$-unsaturated acids thereof such as acrylic acid, methacrylic acid and vinylbenzoic acid; olefins such as ethylene, propylene, and butylene; diolefins such as butadiene and 2,3-dimethylbutadiene and the like and other vinyl monomers within the knowledge and skill of an ordinary worker in the art.

In a preferred embodiment of the present invention, the polymers useful in the present invention have the formula:

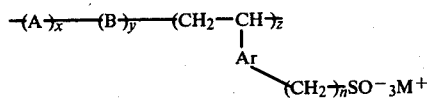

wherein A is a polymerized α,β-ethylenically unsaturated monomer as described above; B is a polymerized polyvinyl aromatic monomer, such as divinylbenzene, trivinylbenzene, divinylnaphthalene and the like and substituted derivatives thereof as described hereinabove; Ar is arylene, such as phenylene, naphthalene and the like and alkyl and halo derivatives of same such as chlorophenyl, tolyl, and ethylphenyl; M is a univalent cation, such as an alkali metal such as sodium, potassium, lithium and the like, ammonium, hydrogen and the like; x is from 0 to about 50 mole percent; y is from about 0.1 to about 20 mole percent; z is from about 50 to about 99.9 mole percent; and n is an integer from 0 to 6.

In an even more preferred embodiment, x is 0 mole percent; y is from about 5 to about 10 mole percent; and z is from about 90 to about 95 mole percent.

It is noted that throughout the specification and claims the term "arylene" is meant to include substituted arylene such as halo phenylene such as chloro, bromo or iodophenylene and alkyl phenylene such as methyl, ethyl, propyl, isopropyl, butyl, pentyl and hexyl phenylene and other substituents which do not interfere with the formation of the microgel particles.

Typical useful polymers which can be sulfonated and used in the materials of the present invention include: poly[vinyl toluene-co-divinylbenzene] (95:5)$_m$; poly[styrene-co-divinylbenzene] (95:5)$_m$; poly[p-(t-butyl)styrene-co-divinylbenzene] (95:5)$_m$, poly[styrene-co-ethyleneglycol dimethacrylate] (93:7)$_m$ and the like.

The molecular weights of the polymers useful in the present invention can be subject to wide variation, but are often in the range of about $10^4$ to about $10^9$.

Since the latex particles of this invention are highly internally crosslinked, each particle can be considered as one macromolecule. The molecular weight can thus be calculated from the size and density of the particles.

The unsulfonated latex polymers useful in the present invention can be prepared by well known polymerization techniques. The preferred methods include variations of emulsion polymerization such as batch, semi-continuous and continuous polymerization methods. Preparation 1 following shows one batch method of making a typical latex polymer.

The temperature at which the polymers described herein are prepared is subject to wide variation since this temperature depends upon such variable features as the specific monomers used, duration of heating, pressure employed and like considerations. However, the polymerization temperature generally does not exceed about 110° C., and most often it is in the range of about 50° to about 100° C. The pressure employed in the polymerization is usually only sufficient to maintain the reaction mixture in liquid form, although either superatmospheric or subatmospheric pressures can be used where such is advantageous. The concentration of polymerizable monomers in the polymerization mixture can be varied widely with concentrations up to about 100 percent by weight and preferably from about 20 to about 70 percent by weight based on the weight of the polymerization mixture, being satisfactory. Suitable catalysts for the polymerization reaction include, for example, from about 0.1 to about 2.0 percent by weight, based on the total monomer weight, of a free radical catalyst, such as hydrogen peroxide, a salt of peroxydisulfate, cumene hydroperoxide, water soluble azo type initiators and the like. In redox polymerization systems conventional ingredients can be employed, such as potassium persulfate and potassium meta bisulfite and others known in the art. If desired, the polymer can be isolated from the reaction medium by freezing, salting out, precipitation or any other procedure suitable for this purpose.

The resulting latex polymers comprise about 50 to 99.9 mole percent of at least one polymerized and then sulfonated monovinyl benzene with from about 0.1 to 20 mole percent of at least one polymerized polyvinyl benzene unit and optimally up to 50 mole percent of at least one other polymerized α,β-ethylenically unsaturated unit. Examples of polymers useful herein include poly[sodium styrene sulfonate-co-divinylbenzene] (95:5)$_m$, poly[sodium vinyl toluene sulfonate-co-divinylbenzene] (95:5)$_m$, and poly[potassium styrene sulfonate-co-divinylbenzene] (93:7)$_m$, and the like.

In some instances, it may be advantageous to include from about 0.5 to about 4 percent by weight, based on the total monomer weight, of a surface active agent or compatible mixtures of such agents in the preparation of the polymers. Suitable wetting agents include the nonionic, ionic and amphoteric types as exemplified by the polyoxyalkylene derivatives, amphoteric amino acid dispersing agents, including sulfobetaines and the like. Such wetting agents are disclosed in U.S. Pat. No. 2,600,831, issued June 17, 1952; U.S. Pat. No. 2,271,623, issued Feb. 3, 1942; U.S. Pat. No. 2,275,727, issued Mar. 10, 1942 and U.S. Pat. No. 2,787,604, issued Apr. 2, 1957; U.S. Pat. No. 2,816,920, issued Dec. 17, 1957 and U.S. Pat. No. 2,739,891, issued Mar. 27, 1956.

Once isolated, the latex polymers are converted to microgels by redispersing in a chlorinated solvent, such as chloroform, methylene chloride, 1,2-dichloroethane, propylene chloride and the like in a concentration range of from about 5 to about 20 weight percent of polymer. This redispersion step is accomplished prior to sulfonation. Sulfonation of the polymers is carried out in organic solvents such as chloroform 1,2-dichloroethane, methylene chloride, propylene chloride and the like and preferably with a sulfur trioxidetrialkyl phosphate complex. Useful complexes include sulfur trioxide with triethyl phosphate, diethyl hydrogen phosphate, and the like as disclosed in U.S. Pat. No. 3,072,618, issued Jan. 8, 1963 to Turbak, hereby incorporated by reference. This reference also discloses methods for making such complexes. In the method of the present invention, sulfur trioxide is mixed with the phosphate compound in a ratio of from about 1 to 5 and the resulting complex is used in a ratio of from about 0.5 to about 10 grams complex per gram of polymer.

Once sulfonation is complete, the sulfonated microgel polymer is then collected by filtration or other suitable means and redispersed in water prior to use. It should be understood that the sulfonation reaction may be indiscriminate in that all of the residues in the polymer may be sulfonated, although the residue derived from the polyvinyl monomer would be expected to be sulfonated to a lesser degree because of steric hindrance.

The compositions of the present invention can be used as antistatic materials in a variety of applications, but particularly in radiation sensitive materials which comprise a support and some type of radiation sensitive layer. Typical radiation sensitive materials include lithographic, electrophotographic, electrographic elements and the like or any other element which has a tendency to have electrostatic charge buildup and spark discharge during manufacture, handling or use; or where there is a need for a conductive layer.

These compositions are particularly useful in photographic materials containing photosensitive silver halide emulsions, including radiographic, direct-positive, negative image-forming, thermally processable, multilayer multicolor, high contrast, diffusion transfer elements and the like. They are also useful in photographic materials such as integral receiving elements and the like which do not have radiation sensitive layers. Other typical elements and suitable photographic silver halide emulsions are disclosed in *Product Licensing Index*, Vol. 92, December, 1971, publication 9232, pp. 107–110, hereby incorporated by reference.

Suitable silver halide emulsions are disclosed in paragraphs I and II of *Product Licensing Index*, cited above. The silver halide emulsions can contain various addenda and vehicles as disclosed in paragraphs III–VIII and XI–XVI. They may be coated on various supports as described in paragraph X. The photographic layer or layers can be present in combination with one or more conventional subbing layers, interlayers, overcoats and the like.

The photographic elements of the present invention can be prepared and processed by any convenient conventional technique. Illustrative preparation techniques are disclosed in *Product Licensing Index*, cited above, paragraphs XVII and XVIII; and exemplary processing techniques are disclosed in paragraph XXIII.

Preferably the compositions of the present invention are admixed with a binder before coating. Generally, the particulate polymers described herein mix well with binders, unlike the uncrosslinked, water soluble polymers of the prior art. Typical useful binders include hydrophilic colloids such as gelatin, protein derivatives such as carboxy methylated proteins, colloidal albumin, cellulose derivatives, poly(vinyl pyrrolidones), poly(vinyl alcohol), acrylate polymers, methacrylate polymers, organic esters of cellulose and any other film forming synthetic or natural polymer that is compatible with and will not coagulate the antistatic microgel polymer latex. Preferred binders are those which are water soluble or water-dispersible in latex form.

The antistatic polymer-binder composition can be used in a variety of locations in photographic elements, including as an outside layer or as an interlayer. They are applied and dried by techniques which are well known in the art. The preferred aqueous coating composition can comprise from about 0.1 to about 20 weight percent, and preferably about 0.5 to about 10 weight percent, of binder. It also has from about 0.1 to about 20 weight percent of sulfonated polymer. The preferred solvent is water although others can be used. The binder to sulfonated polymer weight ratio ranges from about 0.2:1 to about 10:1, and preferably from about 1:1 to about 5:1. Typical total dry film coverage is from about 0.25 to 11 grams of antistatic composition per square meter of support, and preferably from about 0.5 to about 1.1 grams per square meter. These amounts provide resistivity which is less than about $10^9$ ohms/sq. at 50% relative humidity and 70° F. (24° C.).

The following preparation illustrates how polymers useful in the present invention can be prepared.

PREPARATION 1: Preparation of poly[vinyl toluene-co-divinylbenzene] (95:5)m

A mixture of 448 g of vinyl toluene, 47.2 g of 55% divinylbenzene, 22 g of sodium lauryl sulfate, and 4 g of potassium persulfate in 1400 ml of water was stirred under a nitrogen atmosphere at 60° C. as a solution of 1.33 g of sodium bisulfite in 100 ml of water was added dropwise over a 3 hr period. The resultant latex was cooled to room temperature, filtered, frozen, and then thawed to coagulate the polymer. The product was collected by filtration, washed with water and then methanol, and dried in vacuo at room temperature to yield 492 g (99% of theory).

The following examples further illustrate the practice of the present invention.

EXAMPLE 1—Preparation of Microgel Antistatic Composition

A dispersion of 250 grams of poly[vinyl toluene-co-divinylbenzene] (95:5)$_m$, prepared as shown hereinabove, in 1670 ml of chloroform, was added to a vigorously stirred solution of 209 ml of sulfur trioxide and 305 grams of triethyl phosphate in 1250 ml of chloroform at 0° to 5° C. under a nitrogen atmosphere over a 15 minute period. When the addition was complete, the resulting slurry was stirred for 30 minutes at room temperature. The product was collected by filtration, washed with ether, and redispersed while damp in 2.5 liters of water (13% solids). Electron micrographs indicated that the microgel particles had an average particle diameter of about 0.1 micron.

EXAMPLE 2—Sulfonation of Poly[styrene-co-divinylbenzene] (95:5)$_m$

To a stirred solution of 55.5 g of triethyl phosphate in 300 ml of chloroform at 0° to 5° C. was added rapidly over a 5 minute period 38 ml of liquid sulfur trioxide. To the resulting solution was then added over a 15 minute period a microgel dispersion of 50 g of poly[styrene-co-divinylbenzene] (95:5)$_m$ in 300 ml of chloroform. After the addition was complete, the mixture was stirred at room temperature for 15 minutes. The flocculated polymer was collected by filtration, washed with ether, and redispersed while still damp in 500 ml of water. The microgel dispersion was sealed in cellulose bags and dialyzed overnight. The purified dispersion was freeze-dried to give 75 g of product.

Anal. Calcd. for $C_8H_8SO_3$: C, 52.2; H, 4.4; S, 17.4; Found: C, 46.7; H, 4.8; S, 14.2

EXAMPLE 3—Antistatic Coatings

A sulfonated microgel was coated on polyethylene terephthalate film base* with poly[methyl methacrylate-co-methacrylic acid] (66:34)$_m$ as the binder, using techniques well known in the art. The microgel-to-binder ratio was varied from 0.3 to 0.6. Electrical surface resistivities of the dried films were measured after conditioning to 50 percent relative humidity at 70° F. (24° C.). The results are given in Table I. Resistivity is the inverse of conductivity.

*The film base had a subbing layer containing a vinylidene chloride copolymer, over which the sulfonated microgel formulation was coated.

TABLE I

| Composition | Microgel to Binder Ratio | Resistivity $\times 10^{10}$ (50% R.H.) |
|---|---|---|
| K+ Sulfonate Salt | 0.0 | >100 ohms/sq. |

TABLE I-continued

| Composition | Microgel to Binder Ratio | Resistivity × 10¹⁰ (50% R.H.) |
| --- | --- | --- |
| of poly[vinyl toluene-co-divinylbenzene] (95:5)$_m$ | 0.3 | 2.7 ohms/sq. |
| | 0.4 | 1.6 ohms/sq. |
| | 0.5 | 1.1 ohms/sq. |
| | 0.6 | 0.7 ohms/sq. |

Although the invention has been described in detail with particular reference to certain preferred embodiments thereof, variations and modifications can be effected within the spirit and scope of the invention as described hereinabove.

We claim:

1. A radiation sensitive element comprising a support and having coated thereon a photographic silver halide emulsion layer and a layer comprising a sulfonated water-dispersible polymer in an amount sufficient to provide resistivity which is less than about $10^9$ ohm/sq. at 50% relative humidity and 24° C., said polymer having latex particles less than 1.0 micron in size and comprising:
   a. about 50 to about 99.9 mole percent of at least one polymerized and then sulfonated monovinyl aromatic monomer;
   b. about 0.1 to about 20 mole percent of at least one polymerized polyvinyl monomer; and
   c. 0 to about 50 mole percent of at least one other polymerized α,β-ethylenically unsaturated monomer.

2. The element of claim 1 wherein the dry film coverage of the sulfonated polymer layer is from about 0.25 to about 11 grams per square meter.

3. The element of claim 1 wherein the sulfonated polymer layer also contains a binder in a weight ratio of binder to polymer of from about 0.2:1 to about 10:1.

4. The element of claim 1 wherein the sulfonated polymer has the formula:

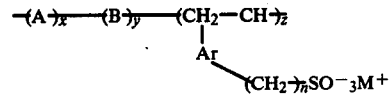

wherein A is a polymerized α,β-ethylenically unsaturated monomer; B is a polymerized polyvinyl aromatic monomer; Ar is arylene; M is a univalent cation; x is from 0 to about 50 mole percent; y is from about 0.1 to about 20 mole percent; z is from about 50 to about 99.9 mole percent; and n is an integer from 0 to 6.

5. The element of claim 1 wherein the sulfonated polymer comprises:
   a. about 90 to about 95 mole percent of at least one polymerized and then sulfonated monovinyl aromatic monomer; and
   b. about 5 to about 10 mole percent of at least one polymerized polyvinyl monomer.

6. The element of claim 5 wherein the sulfonated polymer is sulfonated poly[vinyl toluene-co-divinyl benzene].

7. A photographic element comprising a support and having coated thereon a silver halide emulsion layer and a layer comprising a sulfonated poly(vinyl toluene-codivinyl benzene) in an amount sufficient to provide resistivity which is less than about $10^9$ ohm/sq. at 50% humidity and 24° C., and a binder in a weight ratio of binder to polymer of from about 0.2:1 to about 10:1.

* * * * *